United States Patent
Gow et al.

(10) Patent No.: US 7,264,901 B2
(45) Date of Patent: Sep. 4, 2007

(54) MONOBLOCK BATTERY

(75) Inventors: Philippe Gow, Southfield, MI (US);
Anthony Osgood, Rochester Hills, MI (US); Subhash K. Dhar, Bloomfield Hills, MI (US); Dennis A. Corrigan, Troy, MI (US); Stanford R. Ovshinsky, Bloomfield Hills, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 0 days.

(21) Appl. No.: 09/861,914

(22) Filed: May 21, 2001

(65) Prior Publication Data

US 2002/0012833 A1    Jan. 31, 2002

Related U.S. Application Data (63) Continuation-in-part of application No. 09/670,155, filed on Sep. 26, 2000, which is a continuation-in-part of application No. 09/139,384, filed on Aug. 23, 1998, now Pat. No. 6,255,015.

(51) Int. Cl.
*H01M 10/50*    (2006.01)
*H01M 6/42*    (2006.01)

(52) U.S. Cl. .................. 429/120; 429/149; 429/148; 429/83; 429/163

(58) Field of Classification Search ............. 429/149, 429/151, 153, 156, 159, 120, 82, 71, 163, 429/176, 148, 83
See application file for complete search history.

(56) References Cited

U.S. PATENT DOCUMENTS 5,906,899 A * 5/1999 Noda et al. ............... 429/149
6,296,968 B1    10/2001 Verhoog

FOREIGN PATENT DOCUMENTS

EP    A-0 964 460    12/1999
EP    1059679    * 12/2000

* cited by examiner

*Primary Examiner*—Raymond Alejandro
(74) *Attorney, Agent, or Firm*—Frederick A. Krieger (57) ABSTRACT

A monoblock battery case and a monoblock battery. The monoblock battery case comprises a first and a second container each having partitions that divide the containers into cell compartments. The first container is attached to and co-operates with the second container to form one or more coolant channels disposed between the first and second containers.

17 Claims, 5 Drawing Sheets

MONOBLOCK BATTERY

RELATED APPLICATION INFORMATION

This application is a continuation-in-part of U.S. patent application Ser. No. 09/139,384, filed Aug. 23, 1998 now U.S. Pat. No. 6,255,015. This application is also a continuation-in-part of U.S. patent application Ser. No. 09/670,155, filed Sep. 26, 2000.

FIELD OF THE INVENTION

The instant invention relates generally to improvements in rechargeable high performance batteries, modules and packs. Specifically, the invention relates to multi-cell, monoblock batteries.

BACKGROUND OF THE INVENTION

Rechargeable batteries are used in a variety of industrial and commercial applications such as fork lifts, golf carts, uninterruptable power supplies, and electric vehicles.

Rechargeable lead-acid batteries are a useful power source for starter motors for internal combustion engines. However, their low energy density (about 30 Wh/kg) and their inability to reject heat adequately, makes them an impractical power source for electric vehicles (EV), hybrid electric vehicles (HEV) and 2-3 wheel scooters/motorcycles. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni-MH batteries") are far superior to lead-acid batteries, and Ni-MH batteries are the ideal battery available for electric vehicles, hybrid vehicles and other forms of vehicular propulsion. For example, Ni-MH batteries, such as those described in U.S. Pat. No. 5,277,999, the disclosure of which is incorporated herein by reference, have a much higher energy density than lead-acid batteries, can power an electric vehicle over 250 miles before requiring recharge, can be recharged in 15 minutes, and contain no toxic materials.

Extensive research has been conducted in the past into improving the electrochemical aspects of the power and charge capacity of Ni-MH batteries, which is discussed in detail in U.S. Pat. Nos. 5,096,667, 5,104,617, 5,238,756 and 5,277,999, the contents of which are all incorporated by reference herein.

Until recently the mechanical and thermal aspects of the performance of Ni-MH batteries have been neglected. For example, in electric vehicles and in hybrid vehicles, the weight of the batteries is a significant factor. For this reason, reducing the weight of individual batteries is a significant consideration in designing batteries for electric and hybrid vehicles. Battery weight should be reduced while still affording the necessary mechanical requirements of the battery (i.e. ease of transport, ruggedness, structural integrity, etc.).

Electric vehicle and hybrid vehicle applications introduce a critical requirement for thermal management. Individual electrochemical cells are placed together in close proximity and many cells are electrically coupled together. Therefore, since there is an inherent tendency to generate significant heat during charge and discharge, a workable battery design for electric and hybrid vehicles is judged by whether or not the generated heat is sufficiently controlled. Sources of heat are primarily threefold. First, ambient heat due to the operation of the vehicle in hot climates. Second, resistive or $I^2R$ heating on charge and discharge, where I represents the current flowing into or out of the battery and R is the resistance of the battery. Third, a tremendous amount of heat is generated during overcharge due to gas recombination.

Thus, there exists a need in the art for a battery design which reduces the overall weight thereof and incorporates the necessary thermal management needed for successful operation in electric and hybrid vehicles, without reducing its energy storage capacity or power output. One such battery design is a monoblock battery. An example of a monoblock battery is provided in U.S. patent application Ser. No. 09/139,384 now U.S. Pat. No. 6,255,015, the disclosure of which is incorporated by reference herein. Another example of a monoblock battery is provided in U.S. patent application Ser. No. 09/670,155, the disclosure of which is incorporated by reference herein. The present invention is directed to a monoblock battery design having improved thermal management and improved structural integrity.

SUMMARY OF THE INVENTION

Disclosed herein is a monoblock battery case, comprising: a first container having at least one partition dividing the interior of the first container into a plurality of cell compartments; and a second container having at least one partition dividing the interior of the second container into a plurality of cell compartments, the first container attached to and co-operating with second container to form a coolant channel disposed between the first container and the second container.

Disclosed herein is also a monoblock battery, comprising: a battery case comprising: a first container having at least one partition dividing the interior of the first container into a plurality of cell compartments, and a second container having at least one partition dividing the interior of the second container into a plurality of cell compartments, the first container attached to and co-operating with the second container to form a coolant channel disposed between the first container and the second container; and a plurality of electrochemical cells disposed within the battery case.

DETAILED DESCRIPTION OF THE INVENTION

The present invention is directed to a multi-cell monoblock battery. The monoblock battery includes a plurality of electrochemical cells that are disposed in a specially designed battery case referred to herein as a "monoblock case". Preferably, the monoblock case of the present invention is formed of a non-conductive material. Examples of materials which may be used include a plastic material, a ceramic material, a rubber material and a glass material. Preferably, the monoblock case is formed from a plastic material. Specific materials that could be used are presented in U.S. Pat. No. 5,800,945, the disclosure of which is incorporated by reference herein. It is possible that the monoblock case be formed of a metal provided the electrodes are appropriately insulated from the case.

Figure 1:
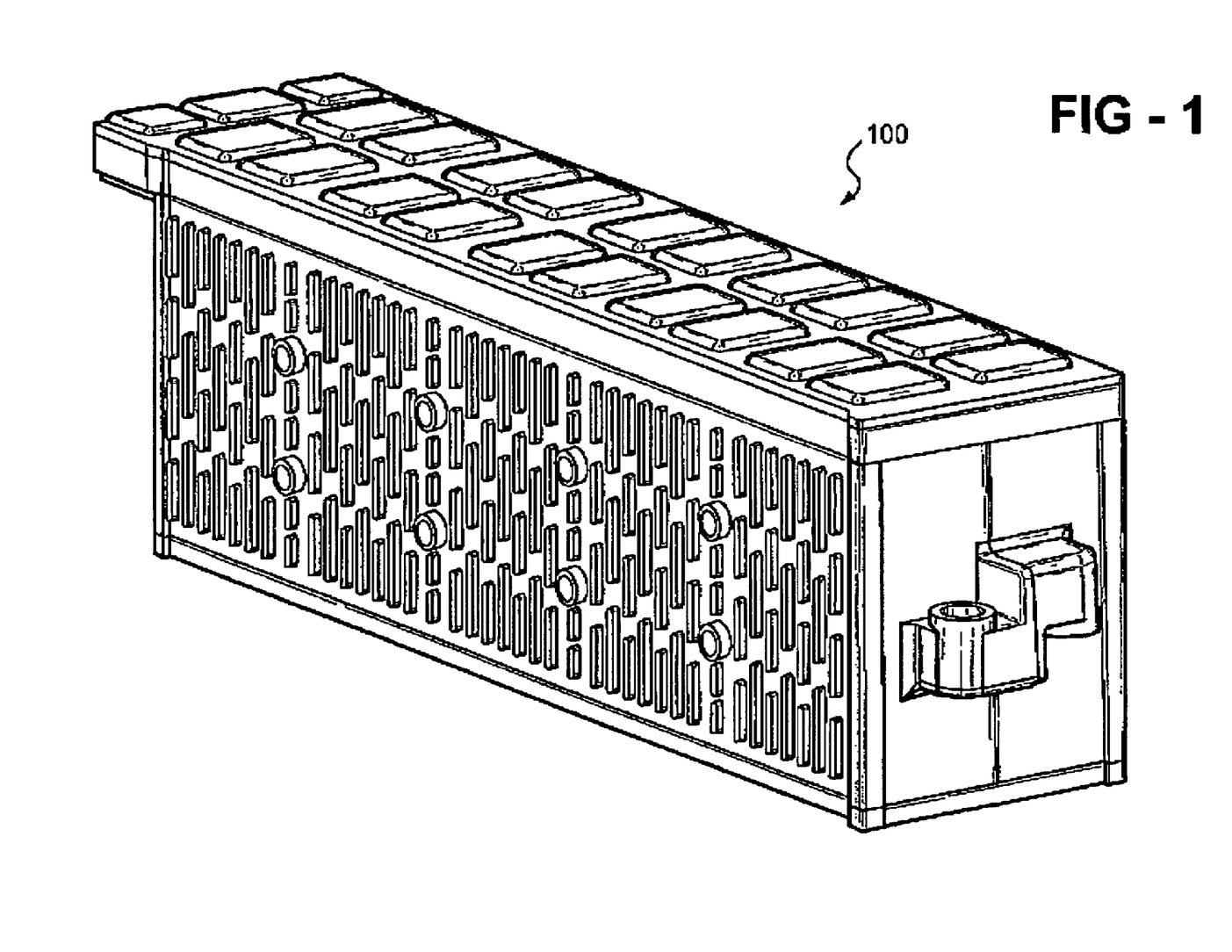
FIG. 1 is an embodiment of the monoblock battery case of the present invention.
Figure 2:
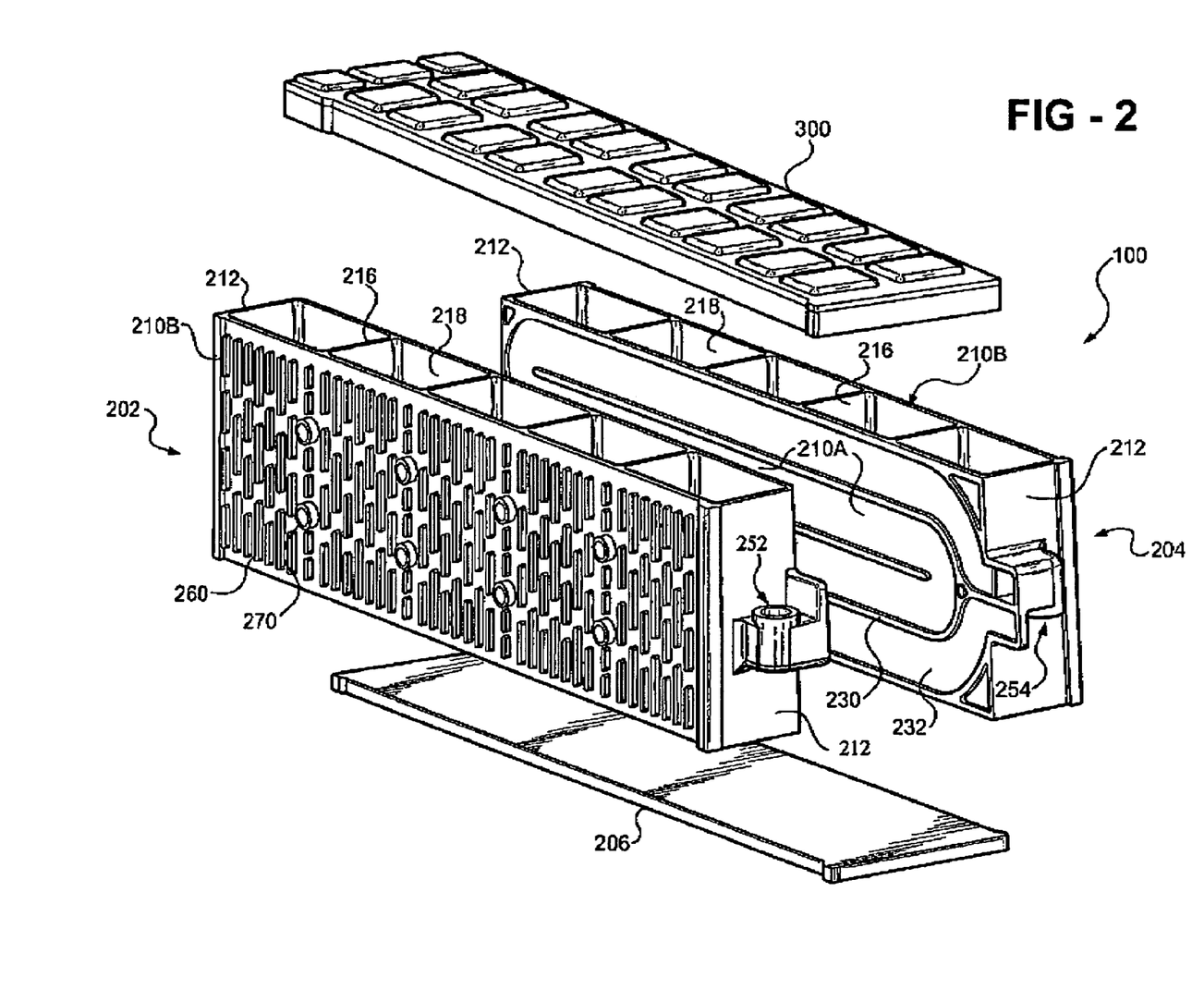
FIG. 2 is an exploded view of the monoblock battery case from FIG. 1.

FIG. 1 is an embodiment of a monoblock case 100 of the present invention. FIG. 2 is an exploded view of the same case. Referring to FIG. 2, it is seen that the monoblock case 100 is formed from multiple pieces. The monoblock case includes a first container 202, a second container 204, a base 206, and a lid 300. Each of the containers 202, 204 includes four walls. Two opposite walls of the container are referred to as "longitudinal walls" 210A,B and two opposite walls are referred to as "lateral walls" 212. The longitudinal walls 210A,B include "inner" longitudinal wall 210A and "outer" longitudinal walls 210B which are opposite the inner longitudinal walls.

Each of containers 202, 204 includes one or more cell partitions 216 which divide the interior of the container into a plurality of cell compartments 218. In the embodiment shown, the cell partitions are substantially planar and plate-like in form. Furthermore, in the embodiment shown, the cell partitions 216 are oriented so that they are substantially parallel to the lateral walls 212 and substantially perpendicular to the longitudinal walls 210A,B. The longitudinal walls 210A,B, lateral walls 212 and the partitions may all be integrally formed as a one-piece construction.

In the embodiment shown in FIG. 2, the base 206 is a separate piece from the first and second containers and serves as the bottom portion for both the first container 202 and the second container 204. Alternately, the first and the second container may each have a separate base which can be separately attached to each container or which can be integrally formed with each container. It is also possible that the longitudinal walls, lateral walls, partitions and base of each container be formed as a single piece.

In the embodiment shown in FIGS. 1 and 2, the monoblock case 100 has a single lid 300. It is also possible that the monoblock case includes a separate lid for the first container 202 and a separate lid for the second container 204.

The first container 202 is attached to the second container 204 so that a wall of the first container co-operates with a wall of the second container to form a coolant channel disposed between the first container and the second container. More specifically, in the embodiment shown in FIG. 2, an inner longitudinal wall 210A of the first container 202 is coupled to an inner longitudinal wall 210A of the second container 204 to form a coolant channel that is disposed between the first and second containers. At least one, and preferably both, of the inner longitudinal walls 210A includes inner ribs 230 which protrude from the surface of the walls to define fluid flow baffles. When the first and second containers are joined together, the inner ribs 230 and baffles on the inner longitudinal wall 210A of the first container 202 cooperate with the inner ribs 230 and baffles on the inner longitudinal wall 210A of the second container 204 to form an "inner" coolant channel 232 that is disposed between the first and second containers. The inner coolant channel is disposed between the cell compartments 218 of the first container and the cell compartments 218 of the second container. The inner coolant channel 232 is disposed between the electrochemical cells placed in the first container and the electrochemical cells placed in the second container and are in thermal contact with the electrochemical cells that are disposed within the cell compartments. Preferably, the stack of positive and negative electrode plates of the electrochemical cells are positioned within the cell compartments 218 so that the wide faces of the plates are substantially parallel to the longitudinal walls of the containers and, hence, to the inner coolant channel. This orientation, shown in FIG. 4, increases the cooling efficiency of the coolant channel.

The inner coolant channel formed by the inner longitudinal walls 210A of the first and second containers is used to provide a thermal management function. The thermal management function is preferably a cooling function to cool the battery and transfer heat away from the electrochemical cells. However, it is possible that the same coolant channel be used to heat the battery and to transfer heat to the electrochemical cells.

To perform the thermal management function, the coolant channel circulates a coolant which flows through the coolant channel. Generally, the coolant is a fluid. That is, the coolant may be a gas or a liquid. An example of a gaseous coolant is air. Examples of liquid coolants are water or a water/glycol mixture. Preferably, the coolant is a liquid and the coolant channel is appropriately adapted for liquid circulation. As noted above, while it is preferable that the coolant be used to transfer heat away from the electrochemical cells, it is also possible that a coolant be used to transfer heat to the electrochemical cells.

Figure 3:
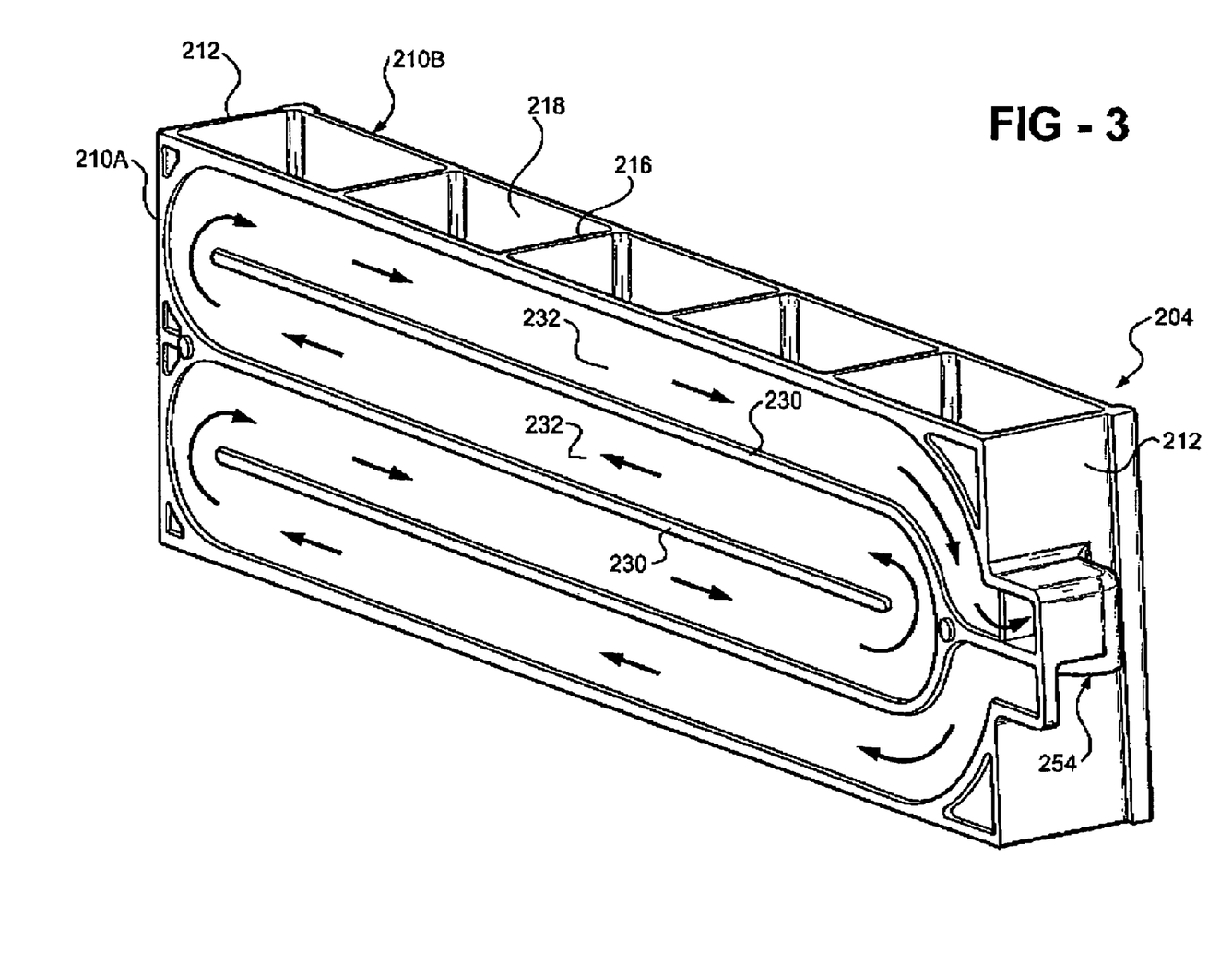
FIG. 3 is a view of the monoblock battery container of the present invention with ribbed wall.

In the embodiment shown, the inner coolant channel 232 forms a surpentine, winding pathway. The channel 232 is substantially horizontally disposed and winds back and forth between the two lateral walls of the monoblock case. As shown, the fluid will enter the monoblock case through an inlet 252, travel through the inner coolant channel 232 and then exit the monoblock case through an exit 254. An example of the flow path shown is provided in FIG. 3. Of course, other pathways are also possible.

In the embodiment shown in FIG. 2, there is a single continuous coolant channel 232 formed between the first and second containers. However, other embodiments are possible where a plurality of coolant channels are formed within the monoblock case between the first and second containers. Each of the coolant channels may have its own corresponding inlet and outlet. Alternately, all of the coolant channels may have a common inlet and/or a commonly outlet. The coolant channels may be coupled outside of the monoblock case.

Preferably, the inner coolant channel 232 is sufficiently sealed so that the coolant does not leak across the ribs 230 as it circulates. Hence, it is preferable that the inner coolant channel 232 forms a fluid-tight pathway. That is, after the coolant enters the inlet 252, the coolant remains confined within the coolant channel until it exits from the outlet 254. The inlet 252 and the outlet 254 may be connected to a coolant pump and to a heat exchanger that can help circulate the coolant and remove heat from the coolant (or supply heat to the coolant if the coolant is being used to heat the battery). The inner coolant channel, the coolant pump and the heat exchanger form a closed circulation system which is capable of transporting a liquid coolant. The use of a closed circulation system eliminates the need to surround the monoblock case with any type of additional enclosure to retain a liquid coolant.

The inner coolant channel may be made fluid-tight by joining the inner longitudinal wall 210A of the first container 202 with the inner longitudinal wall 210B of the second container 204 in a fluid-tight manner. This may be done by placing a gasket between the first and second containers 202 and 204 and then mechanically holding the two containers together with sufficient pressure to form a fluid-tight seal. However, in a preferred embodiment of the invention, the first container 202 is integrally attached to the second container 204. Specifically, in the embodiment shown in FIG. 2, the inner longitudinal wall 210A of the first container is integrally attached to the inner longitudinal wall 210A of the second container. The walls may be integrally attached in different ways. For example, they may be joined by heat sealing, vibration welding, use of an adhesive, or by solvent bonding. In this manner, the first and second containers are joined so as to form a single piece.

To provide the monoblock battery with additional cooling (or heating) capability additional coolant channels may be integrally formed on one or more of the outer walls of the monoblock battery case. For example, a set of protruding "outer" ribs 260 (shown in FIG. 2) may are also formed on the outer longitudinal walls 210B of one or both of the first and the second containers. These outer ribs 260, like those formed on the inner walls 210A, define fluid flow baffles. A cover plate (not shown) may be affixed to each of the outer longitudinal walls 210B. The cover plates co-operate with the outer ribs 260 and the baffles of the corresponding outer longitudinal wall 210B to form one or more "outer" coolant channels on one or both of the outer longitudinal walls of the monoblock case. The outer coolant channels may be used to transport either a liquid or gaseous coolant but are preferably used to transport a gaseous coolant such as air. Tabs 270 are provided in the outer longitudinal walls 210B to help position and attach the end plates.

Hence, the monoblock battery case of the present invention may be provided with two or more independent sets of coolant channels. A set of one or more inner coolant channels may be used for gaseous or liquid (and preferably liquid) cooling. One or more sets of outer coolant channels may be used for gaseous or liquid (and preferably gaseous) cooling. Hence, the monoblock battery of the present invention allows for both liquid cooling and gaseous cooling (such as air cooling) at the same time.

In an alternate embodiment of the invention, it is possible to integrally attach more than two containers together to form an even larger monoblock battery. For example, the longitudinal wall of a third container may be integrally attached to the second container 204 shown in FIG. 2 to form a monoblock case with three containers. At least one coolant channel would be present between the first and second container, and at least one coolant channel would be present between the second and third container. Additional containers may be added in a like manner.

In an alternate embodiment of the invention, ribs may be formed on one or both of the lateral walls of the first and/or the second container, and the lateral walls of two containers may be integrally attached to form the coolant channels.

In yet another embodiment of the invention, it is possible to form protruding ribs on the lid and/or on the base of individual monoblock cases and then stack one case on top of the other so that coolant channels are formed between the base of the top monoblock case and the lid of the bottom monoblock case. In this scenario, the base of the top monoblock case would preferably be integrally attached to the lid of the bottom monoblock case.

The monoblock battery case of the present invention accommodates a plurality of electrochemical cells to form a monoblock battery. It is preferable that a single electrochemical cell be placed in a separate cell compartment. In one embodiment, a single electrochemical cell is disposed in a separate one of each of the cells compartments.

It may also be possible that more than one electrochemical cell be placed in at least one of the cell compartments. For example, two or more electrochemical cells may be placed into a single cell compartment by first placing each of these electrochemical cells into a protective polymeric bag prior to placing the cells into the cell compartment. The polymeric bag prevents the electrolyte of each of the electrochemical cells (within the compartment) from contacting the electrolyte of any of the other electrochemical cells within the compartment.

Each electrochemical cell preferably includes a stack of one or more positive electrodes, one or more negative electrodes, separators separating the positive electrodes from the negative electrodes, and an electrolyte. As discussed, the stack of electrodes are preferably positioned within each of the cell compartments so that the wide faces of the electrode plates are parallel to the longitudinal walls 210A,B of each of the containers. However, it is also conceivable that the stack of electrodes be positioned within the cell compartments in other ways (for example, so that wide faces of the plates are parallel to the lateral walls 212 instead).

Some or all of the electrochemical cells disposed within the monoblock battery case may be electrically coupled together in a serial electrical connection and/or a parallel electrical connection. In one embodiment, all of the electrochemical cells are electrically coupled in series. In another embodiment, all of the electrochemical cells are electrically coupled in parallel. In yet another embodiment, a portion of the electrochemical cells are electrically coupled in series while a portion are electrically coupled in parallel. It is also possible to have multiple groups of cells where the cells within each group are electrically interconnected to each other while the cells of one group are not electrically connected to the cells of any other group.

Figure 4:
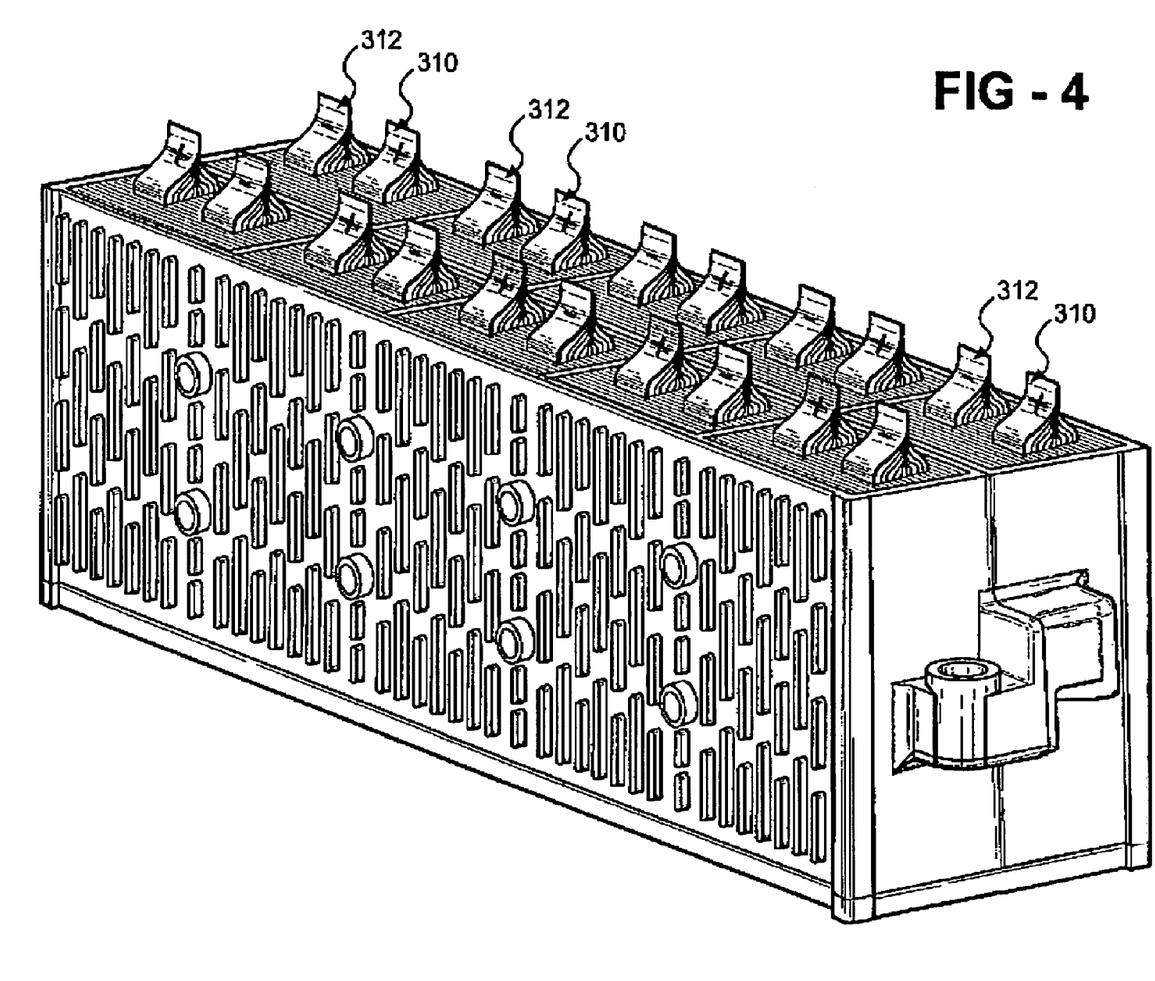
FIG. 4 is view of the monoblock battery of the present invention showing placement of electrochemical cells within the cell compartments.

The electrical coupling between adjacent cells may be accomplished in different ways. FIG. 4, shows a monoblock battery of the present invention without the lid. Each of the cell compartments accommodates a single electrochemical cell. Each electrochemical cell is formed as a stack of positive and negative electrodes. The positive and negative electrodes are separated by separators. It is again noted that the electrode plates are positioned substantially parallel to the longitudinal walls of the first and second containers.

Figure 5:
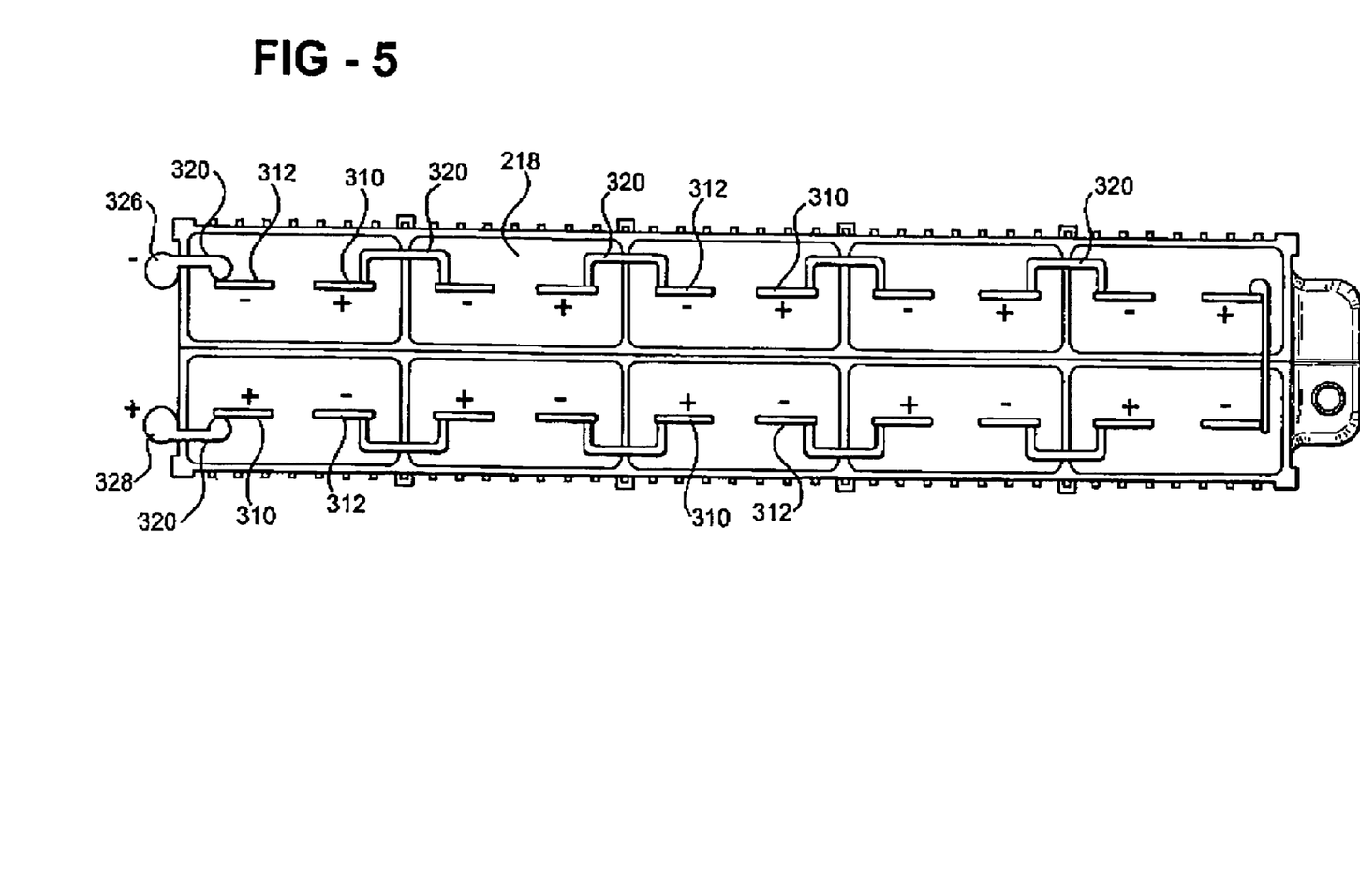
FIG. 5 is a top view of the monoblock battery of the present invention showing connections between positive and negative electrode tabs.

The positive and negative electrodes include current collection tabs attached to the electrodes for transporting electrical energy into and out of the electrode plates. The current collection tabs of the positive electrodes of each electrochemical cell are all welded together into a positive interconnect 310. Likewise, the current collection tabs of the negative electrodes of each cell are all welded together into a negative interconnect 312. To connect all of the electrochemical cells in series, the positive interconnect 310 of one electrochemical cell is electrical coupled to the negative interconnect 312 of an adjacent electrochemical cell. This may be done in different ways. FIG. 5 is a top view of a embodiment of the monoblock battery showing the positive interconnects 310, the negative interconnects 312 for each electrochemical cell within a cell compartment 218. The electrochemical cells are all connected in series by connection spacers 320 coupled between the positive interconnect of another electrochemical cell in an adjacent cell compartment. Connection spacers 320 also connect the electrochemical cells to the negative battery terminal 326 and to the positive battery terminal 328.

The connection spacers may be formed from many different conductive materials. For example, they may be formed from nickel, copper, a nickel alloy, a copper alloy, nickel-plated copper, or nickel-plated copper alloy. The connection spacers 320 are preferably welded to the positive and negative interconnects as well as to the positive and negative battery terminals.

The connection spacers are preferably positioned so that they go over the top of the container partitions and walls. This may be accomplished by placing the connection spacers in a specially designed lid for the battery case. It is also conceivable that the connection spacers could be positioned so that they go through small openings placed in the partitions and walls of the containers.

The monoblock case is preferably designed so that the electrolyte within each of the cell compartments 218 is isolated from the electrolyte of any other of the cell compartments. This is done to avoid self-discharge electrical shorting paths between the cells. However, it is preferable that the gasses from each of the individual cells are all shared within a common region of the battery case so that the battery case serves as a common pressure vessel for each of the electrochemical cells within the battery. The common region of the battery case may be incorporated into a specially designed lid for the battery case.

To help prevent electrolyte leakage between cell compartments each of the openings in the top of the cell compartments may be covered with a gas-permeable, hydrophobic membrane. The membrane coverings will prevent the escape of the electrolyte from each compartment. However, since they are gas-permeable, they will permit the gases from each of the cell compartments to enter the common region within the battery case.

The gas-permeable, hydrophobic membrane may be formed of a material that has a gas diffusion surface area sufficient to compensate for the overcharge gas evolution rate. The may be from about 5 cm$^2$ to about 50 cm$^2$ per 12 Ah cell. Generally, the hydrophobic material is any material which allows passage of the battery gases but not the battery electrolyte. Examples of materials are materials comprising polyethylene with calcium carbonate filler. Other examples include many types of diaper material. An example of a material which may be used is the breathable type XBF-100W EXXAIRE film that is supplied by Tridegar products. This film is a polyethylene film that has been mixed with fine calcium carbonate particles and then further stretched to make it porous. In one embodiment, the layer is chosen to have a thickness of about 0.25 gauge (0.25 g per square meters), which corresponds to about 0.001 inch. The Gurley porosity of the material is chosen to be about 360 (360 seconds for 100 cc of gas to pass per square inch with a gas pressure of 4.9 inches of water). The hydrophobic nature of this film is demonstrated by a very high contact angle in 30% KOH electrolyte of about 120 degrees.

As shown in FIG. 2, the monoblock battery 100 also includes a lid 300 which is sealingly fitted to the top of the monoblock container 100. The lid may include the connection spacers which, as described above, connect the positive interconnect of one electrochemical cell to the negative interconnect of another cell. As noted above, the lid may be designed so that gases from each of the electrochemical cells can pass into a common region of the lid (hence, as noted, the monoblock case serves as a common pressure vessel for each of the electrochemical cells). The lid preferably includes one or more pressure relief vents for the common pressure region.

Generally, the electrolyte used in the monoblock battery of the present invention may be any aqueous or nonaqueous electrolyte. An example of a nonaqueous electrochemical cell is a lithium-ion cell which uses intercalation compounds for both anode and cathode and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Preferably, the electrochemical cell of the present invention is an alkaline electrochemical cell. The alkaline electrolyte may be an aqueous solution of an alkali metal hydroxide. Preferably, the alkaline electrolyte includes an aqueous solution of potassium hydroxide, sodium hydroxide, lithium hydroxide or mixtures thereof. The alkaline electrolyte may be a mixed alkali hydroxide of potassium and lithium hydroxide.

Generally, the positive and negative active materials used in the monoblock battery of the present invention may be any type of active battery materials used in the art. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the positive electrode active material is a nickel hydroxide material.

Examples of negative electrode materials include metallic lithium and like alkali metals, alloys thereof, alkali metal absorbing carbon materials, zinc, cadmium hydroxide, hydrogen absorbing alloys, etc. Preferably, the negative electrode active material is a hydrogen absorbing alloy (also referred to in the art as a hydrogen storage alloy). It is within the spirit and intent of this invention that any hydrogen absorbing alloy can be used. In a preferable embodiment of the present invention, each electrochemical cell is a nickel-metal hydride cell comprising negative electrodes including hydrogen absorbing alloy materials as the active material, and positive electrodes including nickel hydroxide as the active material.

In a preferred embodiment of the present invention, the monoblock battery is a nickel-metal hydride monoblock battery. Hence, the monoblock battery of the present invention may thus operate at pressures of at least the standard operating pressures of a sealed nickel-metal hydride battery. This may vary depending upon the actual hydrogen absorbing alloy and nickel hydroxide materials used as the active electrode materials. In one embodiment of the invention, the monoblock battery may operate at a peak pressure of at least 10 psi, preferably at a peak pressure of at least 25 psi and more preferably at a peak pressure of at least 50 psi. In another embodiment of the invention, the monoblock battery may operate at peak pressures up to about 140 psi. Hence, it is preferable that an embodiment of the monoblock case should be able to withstand peak operating pressures from about 10 psi to about 140 psi. Of course, the monoblock battery and monoblock case of the present invention are not limited to such operating pressures.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

We claim:

1. A monoblock battery, comprising:
   a battery case comprising:
   a first container having at least one partition dividing the interior of said first container into a plurality of cell compartments, and
   a second container having at least one partition dividing the interior of said second container into a plurality of cell compartments, said first container joined to and co-operating with said second container to form at least one coolant channel disposed between said first container and said second container so that a portion of the coolant channel is enclosed within the battery when said first container is joined to said second container, said coolant channel cooperating with an inlet and an outlet, said inlet integrally connected to an exterior portion of said first container, said outlet integrally connected to an exterior portion of said second container, and said coolant channel, inlet and outlet are further configured so coolant exiting the coolant channel is not routed through an interior portion of the second container to pass through the outlet; and
   a plurality of electrochemical cells disposed within said battery case.

2. The battery of claim 1, wherein said coolant channel includes a rib of said first container abutting a surface of said second container.

3. The battery of claim 1, wherein said coolant channel is fluid-tight.

4. The battery of claim 1, wherein said coolant channel comprises a tortuous path.

5. The battery of claim 1, wherein said inlet or said outlet is positioned at a sidewall of said first or second container.

6. The battery of claim 1, wherein said battery case comprises a plastic.

7. The battery of claim 1, wherein said plurality of electrochemical cells are nickel-metal hydride electrochemical cells.

8. The battery of claim 1, wherein said coolant channel is configured to transfer heat to said electrochemical cells.

9. The battery of claim 1, further comprises an outer coolant channel integrally formed on an outer wall of said battery case.

10. The battery ease of claim 1, wherein said battery case includes both gaseous cooling and liquid cooling.

11. The battery of claim 1, further comprising a plurality of ribs positioned at an exterior portion of said battery case.

12. The battery of claim 1, wherein said electrochemical cells include an alkaline electrolyte.

13. The battery of claim 1, wherein said first container is welded to said second container.

14. The battery of claim 1, wherein said first container is joined to said second container utilizing an adhesive.

15. The battery of claim 1, wherein said electrochemical cells comprise nickel-metal hydride.

16. The battery of claim 1, further comprising a pressure relief vent.

17. The battery of claim 1, further comprising a gas-permeable hydrophobic membrane covering an opening of at least one of said cell compartments of the first or second container.

* * * * *